Sept. 23, 1952     E. L. STOCKWELL     2,611,641
HYDRAULIC DUMPING ATTACHMENT FOR TRUCKS
Filed Nov. 2, 1948     3 Sheets-Sheet 1

Inventor
Elmer L. Stockwell

By Clarence A. O'Brien
and Harvey B. Jacobson
Attorneys

Sept. 23, 1952  E. L. STOCKWELL  2,611,641
HYDRAULIC DUMPING ATTACHMENT FOR TRUCKS
Filed Nov. 2, 1948  3 Sheets-Sheet 2

Inventor

Elmer L. Stockwell

By *Clarence A. O'Brien and Harvey B. Jacobson*
Attorneys

Sept. 23, 1952        E. L. STOCKWELL        2,611,641
HYDRAULIC DUMPING ATTACHMENT FOR TRUCKS
Filed Nov. 2, 1948        3 Sheets-Sheet 3
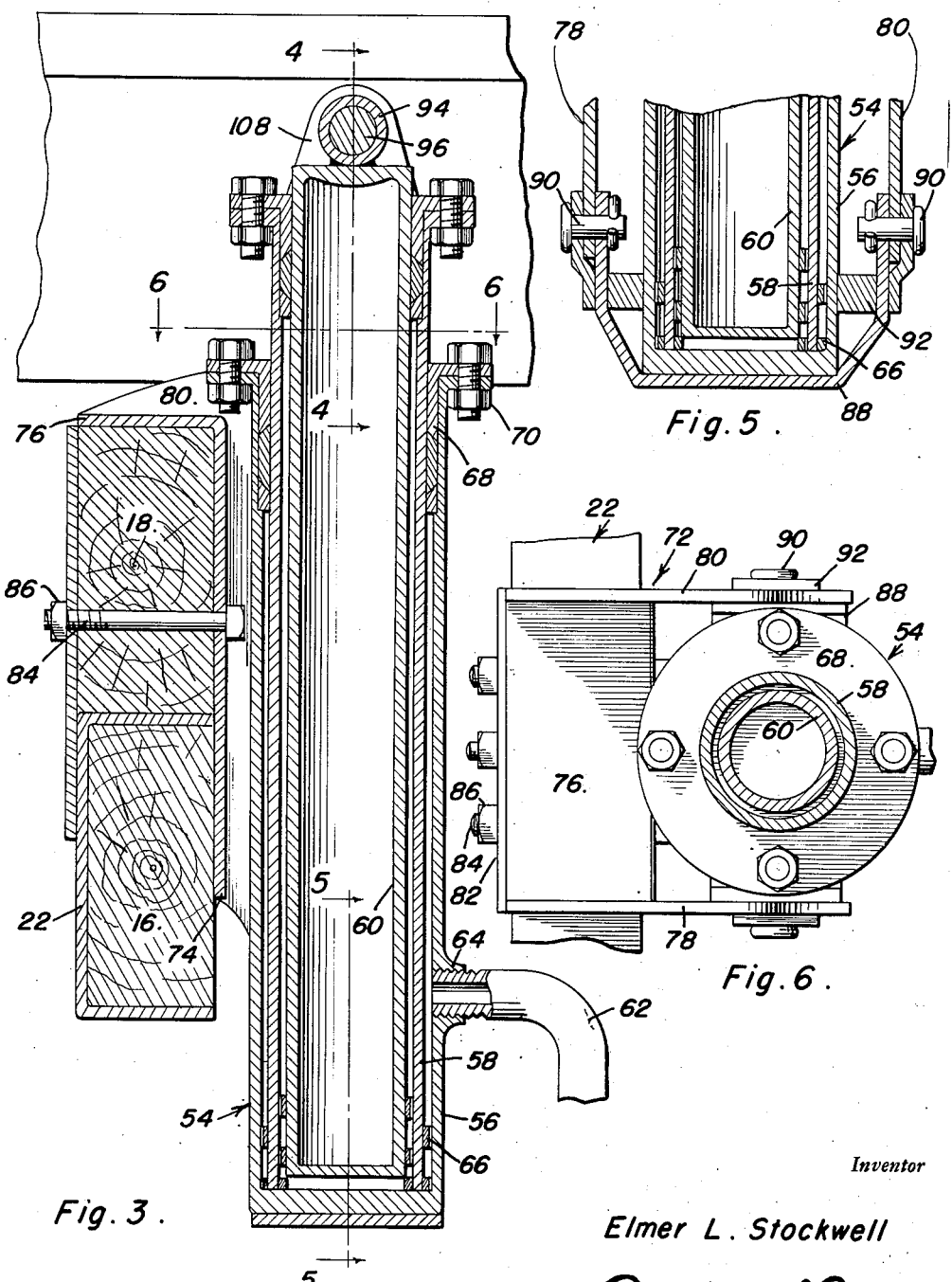
Inventor
Elmer L. Stockwell
By Clarence A. O'Brien
and Harvey B. Jacobson
Attorneys

UNITED STATES PATENT OFFICE 2,611,641

HYDRAULIC DUMPING ATTACHMENT FOR TRUCKS

Elmer L. Stockwell, Graybull, Wyo.

Application November 2, 1948, Serial No. 57,843

14 Claims. (Cl. 298—18)

This invention relates to means for tilting or dumping the body of conventional dump trucks and is especially adapted for employment with a particular dump truck, commonly referred to as a sugar beet truck. This type of truck is used by farmers to transport sugar beets and other similar produce to a sugar refinery. The trucks employed must be designed for side dumping with the aid of a hoisting mechanism provided at refinery receiving stations. However, it represents an additional expense and burden on the farmer to have a truck that can only be dumped by using an outside actuating agent, as the truck then cannot be conveniently employed for transporting tasks around the farm. Thus, it is the primary purpose of the instant invention to enable the truck body to be dumped or tilted by means carried by the truck and operated thereby. More particularly, it is the object of this invention to provide a hydraulic lifting structure for attachment to the truck frame and dump body of the sugar beet truck.

Paralleling the above object, other objects of the instant invention are to provide means for attaching the hydraulic lifting structure to the truck in an adjustable manner for controlling the lift angle of the body; in a dependable and sturdy manner to prevent the body from twisting when lifted and to avoid damaging strains or stresses being imparted to the frame; in a position to provide maximum travel movement of the hydraulic lifting structure within a minimum of space; and in a substantially vertical inoperative position between the frame and body, so as to obtain a maximum lift and yet maintain proper road clearance.

Conventional sugar beet trucks are conventionally constructed with respect to the chassis and driving structure, but the truck bodies are substantially large and overlie the frame on both sides being especially constructed for the purpose of transporting the sugar beets or similar produce. The truck frame includes the conventional longitudinally extending members, upon which are mounted a plurality of cross frame members. The body is conventionally made of wood and is provided with hinged sides, the body being pivotally secured at one side to the frame members by means of a longitudinally extending pivot rod. The body is provided on the exterior surface of its bottom or underside with cross pieces, adapted to rest on the sills when the truck body is in road position. The cross braces are adapted to seat on the sills and are spaced in parallelism to receive the cross members of the frame.

This invention can be easily attached to the foregoing standard truck structure without any alterations of the structure. The invention includes twin compound hydraulic cylinders or lifting jacks, pivotally attached to the frame members and to the cross braces on the dump body, each of the pivot points being braced and strengthened. The jacks are pivotally attached to a bracket, which is securely hooked over the top of the sills, so that the entire load is carried by the frame. The tilting stress is absorbed by the cross braces of the dump body, the cylinder rams or lifting rods, being pivoted to bracket members secured between the cross braces of the body. A conventional pump, actuated by a standard power take-off unit and control valve is employed in association with a standard fluid circuit to raise and lower the lifting rams.

These and ancillary objects and structural features of merit are attained by this invention, a preferred embodiment of which is set forth in the following description and illustrated in the accompanying drawings, wherein:

Figure 3 is a vertical sectional view of the hydraulic cylinder in its fully collapsed or rest position;

Figure 5 is a vertical sectional detail view taken on line 5—5 of Figure 3;

Figure 6 is a horizontal sectional detail view taken on line 6—6 of Figure 3.

Figure 1:
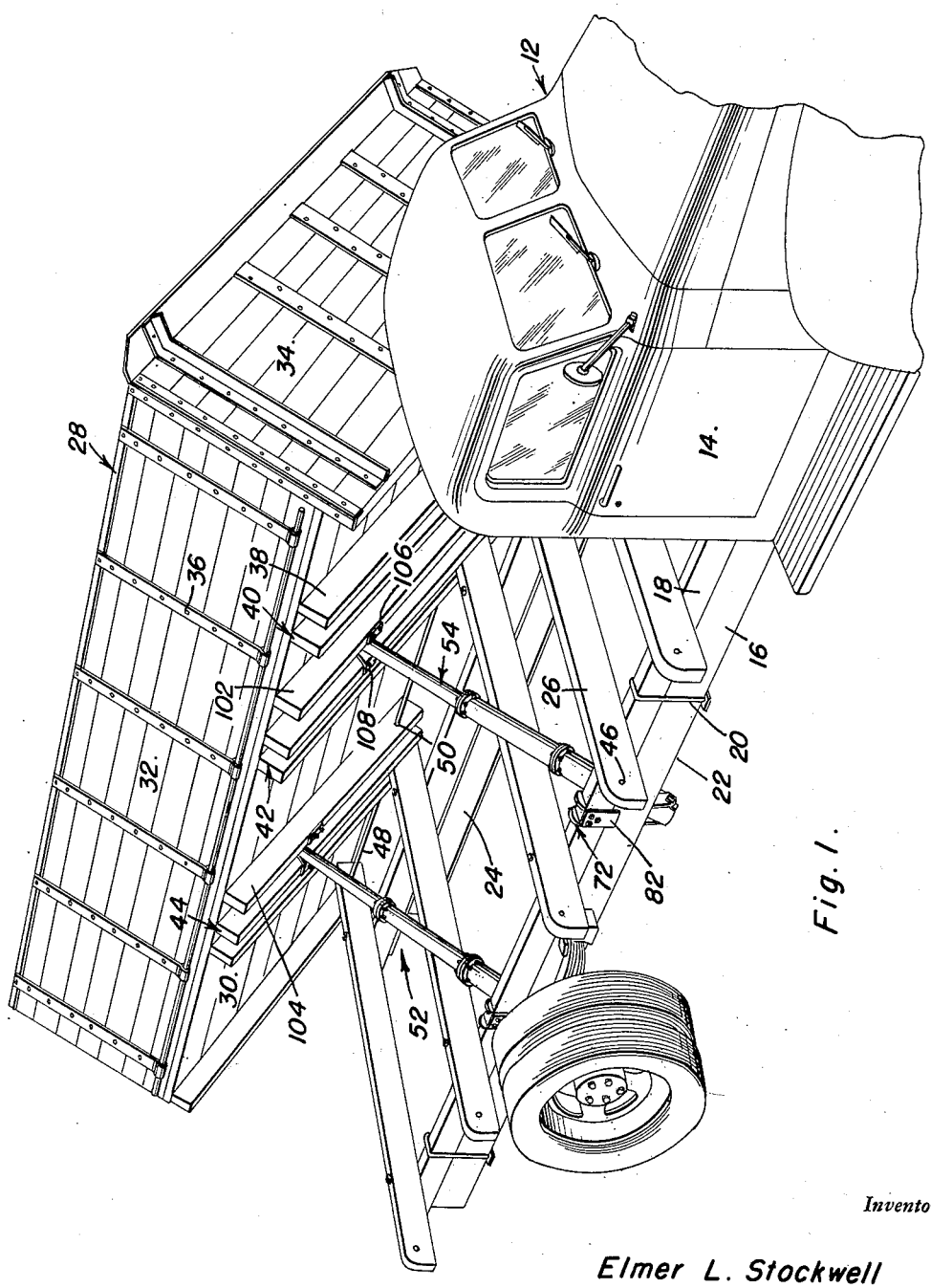
Figure 1 is a perspective view of a standard beet truck, illustrating the dump body in a tilted or lifted position, with hydraulic lifting means, constructed and attached in accordance with the principles of this invention, associated with the frame and body.

Referring now to the drawings, and particularly to Figure 1 thereof, a conventional and standard beet truck, generally designated by the character reference 12, is illustrated and includes a cab 14 and conventional motor and driving structure, not shown. A standard frame projects rearwardly from the cab and includes longitudinally extending frame members or sills 16 and 18 secured together by means of cleats or brackets 20, the member 18 being superimposed on the member 16 and forming one of the side frames 22. The other side frame 24 is formed in a similar manner and extends parallel with the side frame 22. A plurality of transverse supporting members or braces 26 are mounted on the side members 22 and 24 and arranged in longitudinal spacement thereon. The transverse supporting members 26 have their respective opposed ends projected outwardly beyond the side members. The truck body 28 includes a floor structure 30 from which extend upraised side walls 32 and end walls 34, the walls being formed of a plurality of horizontal slats joined by vertical stay members 36. The side walls are preferably hinged so that they are capable of being lowered. The floor or underside of the body 30 is provided with cross braces or bar members 38, which are arranged in pairs spaced apart, each pair, 40, 42 and 44, being adapted to occupy a position on each side of one of the cross frame members 26, when the body is in its normal lowered and travelling position.

The body is tiltably associated with the frame and, in this respect, the body is pivoted to the frame at one of its longitudinal side edges, so that the body tilts sideways with respect to the frame. The cross frame members 26 are provided with longitudinally aligned openings 46, formed in their extending ends to receive a pivot rod 48 which extends through longitudinally registered or aligned openings 50 in the transverse body brace members. As seen in Figure 1, the body can be raised and lowered about the pivot rod 48 tilting sideways to deliver a load at the side of the truck.

The foregoing structure briefly defines a standard beet truck, to which the instant invention is attached for raising and lowering the body with respect to the frame. Thus, twin hydraulic jacks or hoisting cylinders 52 and 54 are pivotally suspended upon the frame and pivotally associated with the body for raising and lowering the same. The hydraulic hoisting means includes hydraulic jacks each comprising a cylinder 56 supported pivotally at its lower end and inner and outer telescoping piston sections or rams 58 and 60. The type of hydraulic hoist, including the cylinders and nested piston elements is conventional per se, the outer piston 58 being slidable in the cylinder, while the inner piston slides within the outer piston during telescopic movement of the pistons. The inner piston at its outer end is pivoted to the body so that a pivotal or universal connection between each hydraulic jack and the body and frame is obtained. A flexible conduit 62, associated with a fluid circuit or system and connected to a conventional pump, operated by a conventional power take-off, not shown, is threadingly engaged in an internally threaded nipple 64 formed on the cylinder 56, adjacent the lower end thereof. Of course, conventional rings 66 are provided between the inner and outer piston elements and also, conventional packing glands 68 are secured at the outer ends of the cylinder and inner and outer pistons by fastening means 70.

Means is provided for securely and pivotally supporting the cylinder 56 to one of the side members, preferably the side member 22. In this respect, a bracket member 72, substantially L-shaped and having a flat, vertically extending section 74 and a lateral end extension 76 is provided. The bracket is provided with parallel opposed side walls 78 and 80 and is secured to the body sills by seating the lateral end 76 on the top of the sill or side frame member 22. A plate 82 is disposed on the outer surface of the side member to secure the bracket to the side member and brace the same in its attached placement. For this purpose, bolts 84 are inserted transversely through the section 74 of the bracket and through the frame member and the bracing plate 82 with locking nuts 86 received on the extending end of the bolts. The opposed side walls 78 and 80 depend below the sills and are adapted to pivotally support the lower end of the cylinder 56. In this respect, a U-shaped bracket or supporting member 88 is pivoted to the lower ends of the side walls, the parallel ends thereof being pivoted by rivets or pivot pins 90 thereto. The cylinder 56 has its lower closed end securely mounted on the medial portion of the bracket 88. A bracket or retaining member 92 is secured by the members 90 around a portion of the circumference of the cylinder to retain the same in the proper position. It is to be noted that the cylinder is normally retained in a vertical position as shown in Figure 3 when the body is seated on the frame, the piston elements being nested in the cylinder and the same received between the side walls 78 and 80 of the bracket. Thus, the jacks are guided in their raising and lowering movements and are held in a vertical plane by the side walls, preventing binding of the pivots 90.

Figure 4:
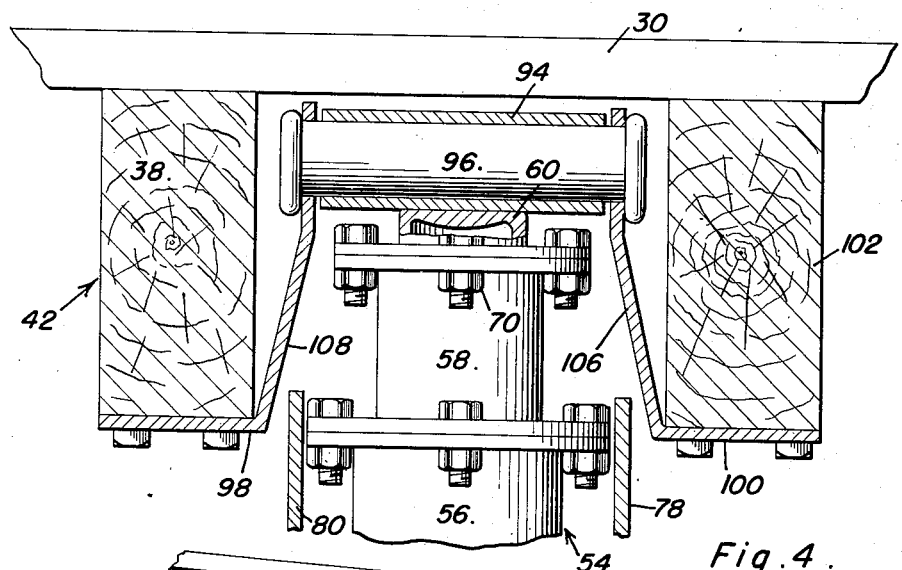
Figure 4 is a view partly in elevation and partly in section as taken on line 4—4 of Figure 3.
Figure 2:
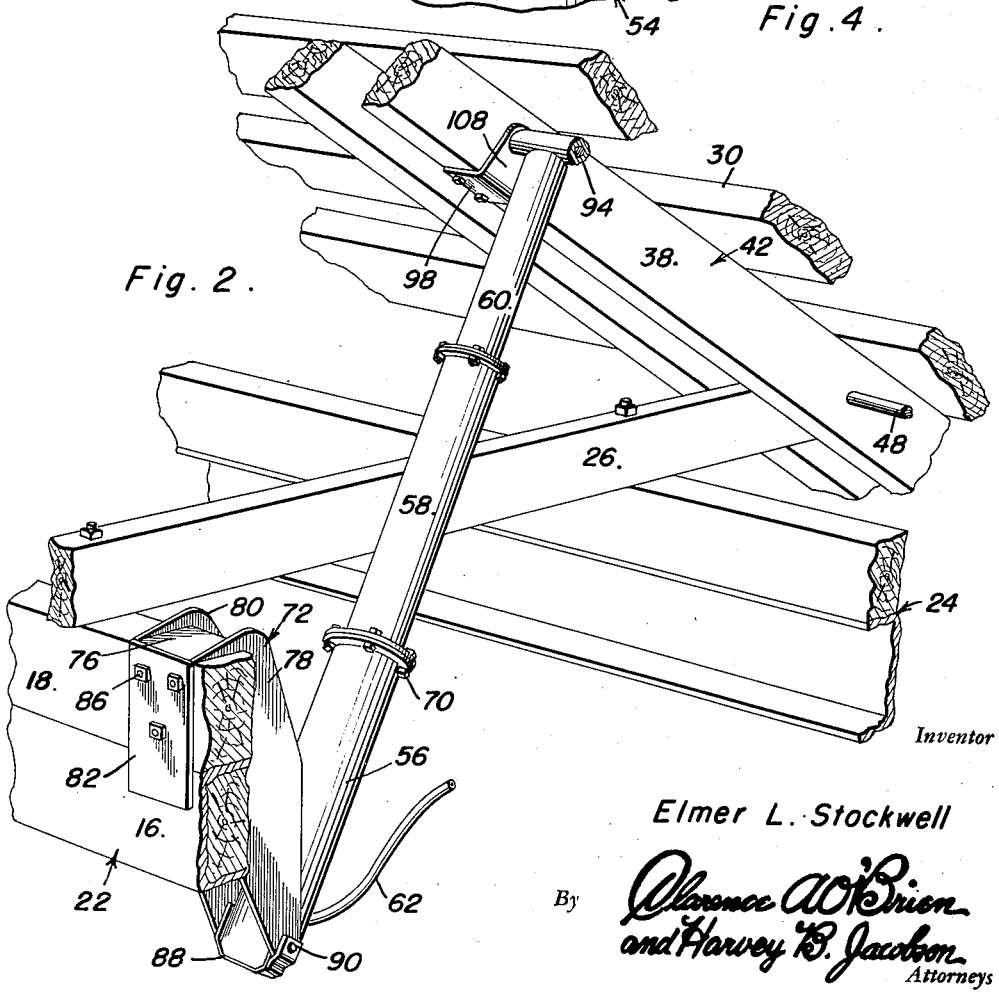
Figure 2 is a fragmentary perspective view of the body and frame, illustrating in perspective the instant invention.

The inner piston 60 has a transverse sleeve or collar 94 disposed at its upper closed end, the collar being rotatably and concentrically mounted on a pin 96. The pin 96 is supported by a pair of angular brackets 98 and 100 between the cross braces 38. It is to be noted that additional cross braces 102 and 104 are secured to the body in parallelism with the sets 42 and 44 and secured adjacent to one of the members thereof. This is not an essential modification of the standard body structure but allows of a more proper placement of the jacks with respect to the body. Thus the angular brackets are secured, as seen in Figure 4 to the brace member 102 and one of the members of the set 42. The angular brackets are bolted to the bottom of the members and have inclined sides 106 and 108 vertically disposed therebetween. The pin 96 is journaled in aligned apertures formed in the extending ends of the sides and secured therein by enlarged ends.

It is to be here noted that the angular brackets can be adjusted on the members with respect to the pivoted side of the body, the placement thereof controlling the angle of tilt of the body. Thus the nearer to the pivot point that the brackets are placed to receive the inner piston, the higher the body will tilt.

When it is desired to dump the body, to deposit the load of sugar beet or the like produce on the ground along side of the truck, the following operation takes place. Pressure is forced into the cylinder through the flexible line 62, forcing the piston section 58 upwardly and outwardly and moving the inner piston 54 upwardly and outwardly thereof, the inner piston sliding in the outer piston. It is to be noted that during the initial movement, the cylinder 56 moves around the pivot point 90 and assumes a position in an inclined plane relative to the pivoted side of the body, as the inner pistons move outwardly from the cylinder. Thus, under the pressure admitted through the cylinder, the piston sections move outwardly therefrom and the inner piston pivots around the pin 96 moving the body to its maximum inclined position. The load then gravitates downwardly toward the lower pivoted end of the body and moves through the hinged side thereon.

In the reversed direction to return the body to its normal position on the frame, the pressure fluid is allowed to escape from the cylinder, back through the conduit 62, allowing the body to return by gravity onto the frame, the weight of the body effecting the return thereof about its pivot point 48.

Thus, it can be seen that there is provided an efficient and novel attachment for a dump truck, having a tiltable body and stationary frame. It is to be particularly pointed out that the weight of the body, during its raising and lowering movements, is borne entirely by the side frame members, while the lifting stress is absorbed by the cross braces on the bottom on the body. The twin compound hoisting cylinders or jacks 52 and 54, can be positioned at any point longitudinally on the side members, but it is preferred to attach the same on either sides of the conventional driving wheels for the frame.

While the instant invention has been disclosed, as applied to a particular type of truck, having a side delivery, it is to be understood that the same may be employed with an end delivery truck, the novel means of attaching the jacks being adaptable for attachment to any standard supporting frame and body brace members.

Thus, it is to be understood further that certain other embodiments can be carried out, as coming within the spirit and scope of the appended claims.

Having described the invention, what is claimed as new is:

1. In a dump truck including a frame having longitudinally extending opposed side bars and a dump body supported on said side bars and pivoted to one of the side bars for tilting about a longitudinal axis, a hoist mechanism including a pair of plates secured to the other of said side bars and extending below the side bar, a supporting member pivoted to the lower ends of the plates and including a holder, a hydraulic cylinder having its lower end seated on and secured to the supporting member and received within said holder, a piston rod operatively mounted in the cylinder and means for pivotally securing the outer end of the rod to the underside of the body.

2. In combination with a dump truck including a frame having longitudinally extending opposed side members and a body pivoted at one of its longitudinal sides to one of said frame side members, said body having spaced pairs of transverse brace bars on the lower surface of the floor of the body, means for raising the body about its pivot comprising hydraulic jacks pivotally supported at their lower ends on the other of said frame side members, said pivoted ends being disposed below the side members and adapted to move transversely thereof and pivotally secured at their upper ends between the brace bars of the body, said jacks being normally supported by the frame in a vertical position and adapted to move into an extended position in a plane vertically inclined to the frame.

3. In combination with a dump truck including a frame having longitudinally extending opposed side members and a body pivoted at one of its longitudinal sides to one of said frame side members, said body having spaced pairs of transverse brace bars on the lower surface of the floor of the body, means for raising the body about its pivot comprising hydraulic jacks pivotally supported at their lower ends on the other of said frame side members, said pivoted ends being disposed below the side members and adapted to move transversely thereof and pivotally secured at their upper ends between the brace bars of the body, said jacks being normally supported by the frame in a vertical position and adapted to move into an extended position in a plane vertically inclined to the frame, said upper ends of the jacks being longitudinally adjustable on the brace bars for adjusting the tilting angle of the body.

4. In combination with a dump truck including a frame having longitudinally extending opposed side members and a body pivoted at one of its longitudinal sides to one of said frame side members, said body having spaced pairs of transverse brace bars on the lower surface of the floor of the body, means for raising the body about its pivot comprising hydraulic jacks pivotally supported at their lower ends on the other of said frame side members, said pivoted ends being disposed below the side members and adapted to move transversely thereof and pivotally secured at their upper ends between the brace bars of the body, said jacks being normally supported by the frame in a vertical position and adapted to move into an extended position in a plane vertically inclined to the frame, bracket members hooked on the frame side members, the lower ends of the jacks being pivotally supported by said brackets, and means formed on said brackets for preventing binding of the pivot.

5. In combination with a dump truck body having a frame, a body pivotally mounted on the frame along a longitudinal axis at one side of the frame, the frame having longitudinally extending opposed side members, the body being provided with spaced pairs of transverse brace bars on the lower surface of the floor, bracket members secured on the side member opposite to that upon which the body is pivotally mounted, hydraulic cylinders pivotally supported at their lower ends by said bracket members, inner and outer piston elements extensibly carried by said cylinders, brackets adjustably secured to said body brace bars, and means for pivotally attaching said inner piston elements to said brackets.

6. In a dump truck including a frame having longitudinally extending opposed side members and a body having spaced pairs of transverse brace bars on the lower surface of the floor, said body being pivotally secured at one of its sides to one of the side members of the frame; bracket members secured on the other of said side members, hydraulic cylinders pivotally supported at their lower ends by said bracket members, inner and outer piston elements extensibly carried by said cylinders, brackets adjustably secured to said body brace bars, means for pivotally attaching said inner piston elements to said brackets, said last-named means including a sleeve transversely formed on the outer ends of the inner piston elements, and a rod carried by the brackets, said sleeve being rotatably journaled on the rod.

7. In a dump truck including a frame having longitudinally extending opposed side members and a body having spaced pairs of transverse brace bars on the lower surface of the floor, said body being pivotally secured at one of its sides to one of the side members of the frame; bracket members secured on the other of said side members, hydraulic cylinders pivotally supported at their lower ends by said bracket members, inner and outer piston elements extensibly carried by said cylinders, brackets adjustably secured to said body brace bars, means for pivotally attaching said inner piston elements to said brackets, a rod carried by said brackets, and a sleeve rotatably journaled on the rod and transversely formed on the outer ends of the inner piston elements, 8. In combination with a dump truck including a frame having longitudinally extending opposed side bars and a dump body supported on said side bars and pivotally secured to one of the side bars for tilting about a longitudinal axis therethrough, a pair of transverse parallel brace bars on the undersurface of the floor of the body, a cross frame member mounted upon said frame and adapted to be straddled by said brace bars, a third brace bar on the undersurface of said body parallel to said pair of brace bars, means for effecting pivoting movement between the dump body and the frame, said means including a support secured to the other of said side bars and having opposed lower ends disposed below the side bar, a holder pivoted to the ends of the support, a cylinder having its lower end seated on the holder, a piston operatively mounted in the cylinder and means for pivotally attaching the outer end of the piston to the third brace bar and the adjacent one of said pair of parallel brace bars.

9. A hoist mechanism for tilting a dump truck body about its pivotal axis on a truck frame of the type having a pair of side members and a bar secured to each side member of the frame; comprising a support secured to the top of a bar and extending below the bar and its side member, a cylinder, means pivotally connecting the lower ends of the cylinder and the support, a piston rod operatively mounted in the cylinder, a sleeve mounted upon and extending transversely of the outer end of the piston rod, a bracket secured to the underside of the truck body and a bearing member carried by the bracket for receiving the sleeve.

10. In combination with a dump truck including a frame having longitudinally extending opposed side bars and a dump body supported on said side bars and pivoted to one of the side bars for tilting about a longitudinal axis, a hoist mechanism including a support secured to the other of said side bars and having opposed lower ends disposed below the side bar, a holder pivoted to the ends of the support, a cylinder having its lower end seated on the holder, a piston operatively mounted in the cylinder and means for pivotally attaching the outer end of the piston to the body, a retaining member secured to said opposed lower end of the holder and partially embracing said cylinder.

11. The combination of claim 10 wherein said retaining member and said holder are provided with common pivot means securing them to said lower ends.

12. A side dumping truck comprising a chassis and a dump body, a cross member secured upon and extending transversely of said chassis, a pair of parallel brace bars secured to the underside of the truck body and disposed upon opposite sides of said cross member and pivoted thereto at one end thereof for vertical pivoting movement of the body, a third brace bar parallel to said pair of bars and secured to said truck body, a lifting jack pivotally connected to said chassis, a bracket secured to said third brace bar and to that one of said pair of brace bars which is adjacent to said third brace bar, said lifting jack being pivoted to said bracket.

13. The combination of claim 12 wherein said jack is so connected to the chassis and body as to lie in a vertical position when the body is lowered upon the chassis.

14. The combination of claim 12 wherein said bracket comprises a central transverse rod and a pair of hangers at the end thereof, the jack being journaled upon the rods, each of said hangers being secured to one of said brace bars.

ELMER L. STOCKWELL.

REFERENCES CITED

The following references are of record in the file of this patent:

UNITED STATES PATENTS

| Number | Name | Date |
|---|---|---|
| 1,392,107 | Berry | Sept. 27, 1921 |
| 1,744,897 | Hughes | Jan. 28, 1930 |
| 1,921,917 | Flowers | Aug. 8, 1933 |
| 2,023,700 | Rodler | Dec. 10, 1935 |
| 2,142,089 | Barrett | Jan. 3, 1939 |
| 2,321,406 | Merchant | June 8, 1943 |
| 2,437,890 | Orendorff | Mar. 16, 1948 |
| 2,440,559 | Reichman | Apr. 27, 1948 |
| 2,517,716 | Rolf et al. | Aug. 8, 1950 |

FOREIGN PATENTS

| Number | Country | Date |
|---|---|---|
| 70,680 | Austria | Dec. 10, 1915 |
| 644,158 | France | May 29, 1928 |
| 605,880 | Germany | Nov. 20, 1934 |